United States Patent [19]

Chudakov

[11] Patent Number: 4,848,721
[45] Date of Patent: Jul. 18, 1989

[54] HYDRAULIC VALVE WITH INTEGRATED SOLENOID

[76] Inventor: Stanislav Chudakov, 3594 Moravian Ct., Bethlehem, Pa. 18017

[21] Appl. No.: 293,102

[22] Filed: Jan. 3, 1989

[51] Int. Cl.$^4$ ............................................. F16K 31/12
[52] U.S. Cl. .............................. 251/30.02; 137/454.6
[58] Field of Search .................... 251/30.02, 30.01; 137/454.6, 454.5

[56] References Cited

U.S. PATENT DOCUMENTS 2,822,818  2/1958  Breznick ........................... 137/454.6
2,826,215  3/1958  Wolfslau et al. ................. 137/454.6

FOREIGN PATENT DOCUMENTS 028501   5/1981  European Pat. Off. ......... 251/30.02
196475  10/1985  Japan .................................. 251/30.02
195207   7/1952  United Kingdom ............. 251/30.02

*Primary Examiner*—A. Michael Chambers
*Attorney, Agent, or Firm*—Sanford J. Piltch

[57] ABSTRACT

A solenoid controlled pilot operated valve in which the valve elements are grouped into main and pilot sections including a combined seal-bearing means surrounding the main valve member and a solenoid coil integrated into the pilot control section of either a normally-open or normally-closed configuration of said valve in which the solenoid coil and armature are exposed to pressurized fluid.

2 Claims, 2 Drawing Sheets

HYDRAULIC VALVE WITH INTEGRATED SOLENOID

TECHNICAL FIELD

This invention relates to solenoid controlled pilot operated hydraulic valves.

BACKGROUND OF THE INVENTION

Conventional solenoid controlled hydraulic valves have solenoid coils mounted externally of the valve body. The solenoid is connected with the internal parts of a valve by two distinctive methods:

air gap solenoids have an armature working against a pushpin which is dynamically sealed against leakage of fluid from the valve body;

wet pin solenoids have a coil encircling non-magnetic tubing with a slidably disposed armature, the tubing being internally exposed to system pressure.

There are well recognized disadvantages in both structures. The dynamic seals of the air gap solenoids are not reliable, create substantial friction forces, and limit the valve operating pressure. The non-magnetic tubing of wet pin solenoids creates substantial resistance to magnetic flux and also limits the valve operating pressure. In both configurations the solenoid coils are located on the exterior of the valve body and dissipate heat to the surrounding environment. As a result, solenoid coils of conventional valves have a winding of excessive size and are costly when compared with other valve components.

Consider, in particular, the poppet type solenoid controlled hydraulic valves. The limitations of these type valves can be outlined as follows. Poppets slide within a valve body. Their position is controlled by either internal or external pilot pressure. Valves with internal pilot lines can operate only if the clearance between the slidable poppet and the adjacent valve member is extremely small. This relationship is required in order to control the differential pressure on opposite sides of the poppet. Such closeness of clearance requires very fine machining tolerances and surface finishes of the poppets and adjacent components. These requirements also limit the size of poppet valves having internal piloting since leakage across the poppet becomes uncontrollable with increasing by larger dimensions. One can conclude (with poppet valves having external piloting) that because of the leakage across the poppet body from the pressure line to the pilot line, that these valves cannot be used for applications where internal leakage is not allowed. Further, external pilot sections are actually additional valves with all their complexity and cost.

It is, therefore, an object of the present invention to provide a valve structure where the pilot controlling section is disposed within the valve body immediately adjacent to the main section of the valve and thus, providing a compact structure with a minimum for potential external leakage points and a faster response time.

Another object of the present invention is to provide a solenoid hydraulic valve structure where the solenoid coil is fully integrated with other valve components, by positioning the solenoid coil inside the valve body and exposing the coil to the pressurized fluid. This integration of the electromagnetic coil within the valve body, as disclosed in the present invention, permits construction of the magnetic circuit with practically no detrimental gaps. This construction utilizes the coil electromagnetic forces to their greatest potential.

Another object of the present invention is to provide a solenoid valve structure where the solenoid coil is positioned within the valve body in such a way that the coil contact with the surrounding atmosphere is eliminated making valves constructed in accordance with the present invention capable of operating in hazardous environments.

Another object of the present invention is to provide a solenoid controlled pilot operated valve structure which consists of a main section and a number of pilot sections located closely adjacent the main section in a common valve body constructed in such manner that the main valve section may accomplish different functions according to the pilot section which is actuated. For example the function may be: normally-open or normally-closed directional control, pressure relief, flow check, etc.

Another object of the present invention is to provide a solenoid controlled, pilot operated, poppet type valve structure where the main valve member is slidably sealed by a novel adjustable seal-bearing comprising a deformable plastic sleeve circumferentially mounted over a tapered portion of the main valve member abutting an adjusting nut. Under pressure from the adjusting nut the plastic sleeve moves along the tapered portion expanding to such degree that it fills the clearance between the main valve member and the mating body component of the valve. This creates a minimum friction seal and plain bearing, simultaneously, with leakage reduced to nothing. This greatly reduces requirements for machined finishes and tolerances of principal valve components.

Another object of the present invention is to provide a solenoid controlled valve structure where the solenoid coil is positioned within the valve body chamber and integrated with other valve components in a manner which allows the coil to be cooled by circulating hydraulic system fluid about the coil. Direct contact of coil with system circulating fluid radically improves heat dissipation efficiency.

Other objects and advantages of the present invention will become apparent from the following detailed description.

SUMMARY OF THE INVENTION

The present invention is an improved hydraulic solenoid controlled pilot operated valve structure eliminating the disadvantage of prior art structures, as discussed above, in a novel manner. The present invention includes both normally-open and normally-closed configurations of such solenoid controlled hydraulic valves.

In the disclosed embodiments the valves are configured with a valve body having inlet and outlet connections, a valve chamber and pilot lines. All of the valve parts are disposed within the valve body and generally grouped in two sections, main and pilot sections. The main and pilot sections are sealably separated by a disk shaped member with an axially positioned pilot flow orifice. This orifice is controlled by the movement of the solenoid armature as a result of the excitation of an electromagnetic coil.

The first embodiment of the present invention comprises a solenoid controlled hydraulic valve of normally-closed configuration includes in combination a valve housing, main and pilot sections, inlet and outlet connections, and pilot flow passages. The main section includes a sleeve, a main valve member, an adjustable seal and bearing, and a main valve chamber formed within said sleeve in which said main valve member reciprocates. The sleeve, interposed between said inlet and outlet connections, forms the main passage therebetween and provides a seat closure for the main valve member. The adjustable seal-bearing means surrounds a distally disposed inwardly tapering portion of said main valve member and simultaneously engages the exterior surface of the main valve member and the interior surface of the sleeve creating a leak resistant separation between the main flow passage and the main valve chamber.

A metering orifice provides a connection between the main flow passage and the main valve chamber through the sidewall of the main valve member. This provides a flow path permitting differential pressures to be created between the main flow passage and the main valve chamber to operate the main valve member when a pilot flow is applied. A first spring means is disposed within an annulus in the main valve member and opposed against said disk member for assisting in the operation of the main valve member.

The pilot section includes a solenoid coil and housing, an armature responsive to magnetic forces, a pilot valve member, and a pilot valve chamber formed within a cylindrical extension of the disk member and extending within the solenoid coil in which said pilot valve member and said armature reciprocate. The disk member has an aperture therethrough to provide a pilot flow orifice which may be opened and closed by said pilot valve member in accordance with the energizing and de-energizing of the solenoid coil. A second spring means disposed within an annulus in said armature and opposed against said solenoid housing urges said armature and pilot valve member to attain a position closing the pilot flow orifice. The solenoid coil is disposed within the solenoid housing, which is integrated within the valve housing, and has its curvilinear external surfaces simultaneously exposed to equal fluid pressure of the pilot flow.

Upon energizing the solenoid coil, the armature and pilot valve member are pulled toward a magnetic pole in the solenoid housing, opening the pilot flow orifice, causing a pilot flow to begin which causes a decrease in pressure in the main valve chamber and, in turn, the unseating of the main valve member in response to the decrease in pressure in the main valve chamber. Upon de-energizing the solenoid coil, the armature and pilot valve member are again urged by said second spring means toward the pilot flow orifice, closing the pilot flow orifice, causing the pilot flow to cease which causes an increase in pressure in the main valve chamber and, in turn, the seating of the main valve member in response to the increase of pressure in the main valve chamber.

A second embodiment of the present invention comprises a solenoid controlled hydraulic valve of normally-open configuration includes in combination a valve housing, main and pilot sections, inlet and outlet connections, and pilot flow passages. The main section includes a sleeve, a main valve member, an adjustable seal-bearing means, and a main valve chamber formed within said sleeve in which said main valve member reciprocates. The sleeve, which is interposed between said inlet and outlet connections, forms the main passage therebetween and provides a seat closure for the main valve member. The adjustable seal-bearing means surrounds a distally disposed inwardly tapering portion of said main valve member and simultaneously engages the exterior surface of the main valve member and the interior surface of the sleeve creating a link resistant separation between the main flow passage and the main valve chamber.

A metering orifice provides a connection between the main flow passage and the main valve chamber through the sidewall of the main valve member. This, again, provides a flow path permitting differential pressures to be created between the main flow passage and the main valve chamber to operate the main valve member when a pilot flow is applied. A first spring means is disposed within an annulus in the main valve member and opposed against said disk member for assisting in the operation of the main valve member.

The pilot section includes a solenoid coil and housing, an armature responsive to magnetic forces, a pilot valve member, a first pilot valve chamber formed within a cylindrical extension of the disk member in which said pilot valve member reciprocates, and a second pilot valve chamber formed within the solenoid housing and extending within the solenoid coil in which said armature reciprocates. The disk member has an aperture therethrough to provide a pilot flow orifice which may be opened and closed by said pilot valve member in accordance with the energizing and de-energizing of the solenoid coil. A second spring means is disposed about said pilot valve member and opposed against said disk member for urging said pilot valve member and said armature to attain a position opening the pilot flow orifice. The solenoid coil is disposed within the solenoid housing, which is integrated within the valve housing, and has its curvilinear external surfaces simultaneously exposed to equal fluid pressure of the pilot flow.

Upon energizing the solenoid coil, the armature and pilot valve member are pulled toward a magnetic pole in the cylindrical extension of the disk member, closing the pilot flow orifice, causing a pilot flow to cease which causes an increase in pressure in the main valve chamber and, in turn, the seating of the main valve member in response to the increase of pressure in the main valve chamber. Upon de-energizing the solenoid coil, the armature and pilot valve member are again urged by said second spring means away from the pilot flow orifice, opening the pilot flow orifice, causing the pilot flow to begin which causes a decrease in pressure in the main valve chamber and, in turn, the unseating of the main valve member in response to the decrease in pressure in the main valve chamber.

BRIEF DESCRIPTION OF THE DRAWINGS

For the purpose of illustrating the invention, there are shown in the drawings forms which are presently preferred; it being understood, however, that the invention is not limited to the precise arrangement and instrumentalities shown.

DETAILED DESCRIPTION OF THE PREFERRED EMBODIMENTS

The following detailed description is of the best presently contemplated modes of carrying out the invention. This description is not intended in a limiting sense, but is made solely for the purpose of illustrating the general principles of the invention.

Figure 1:
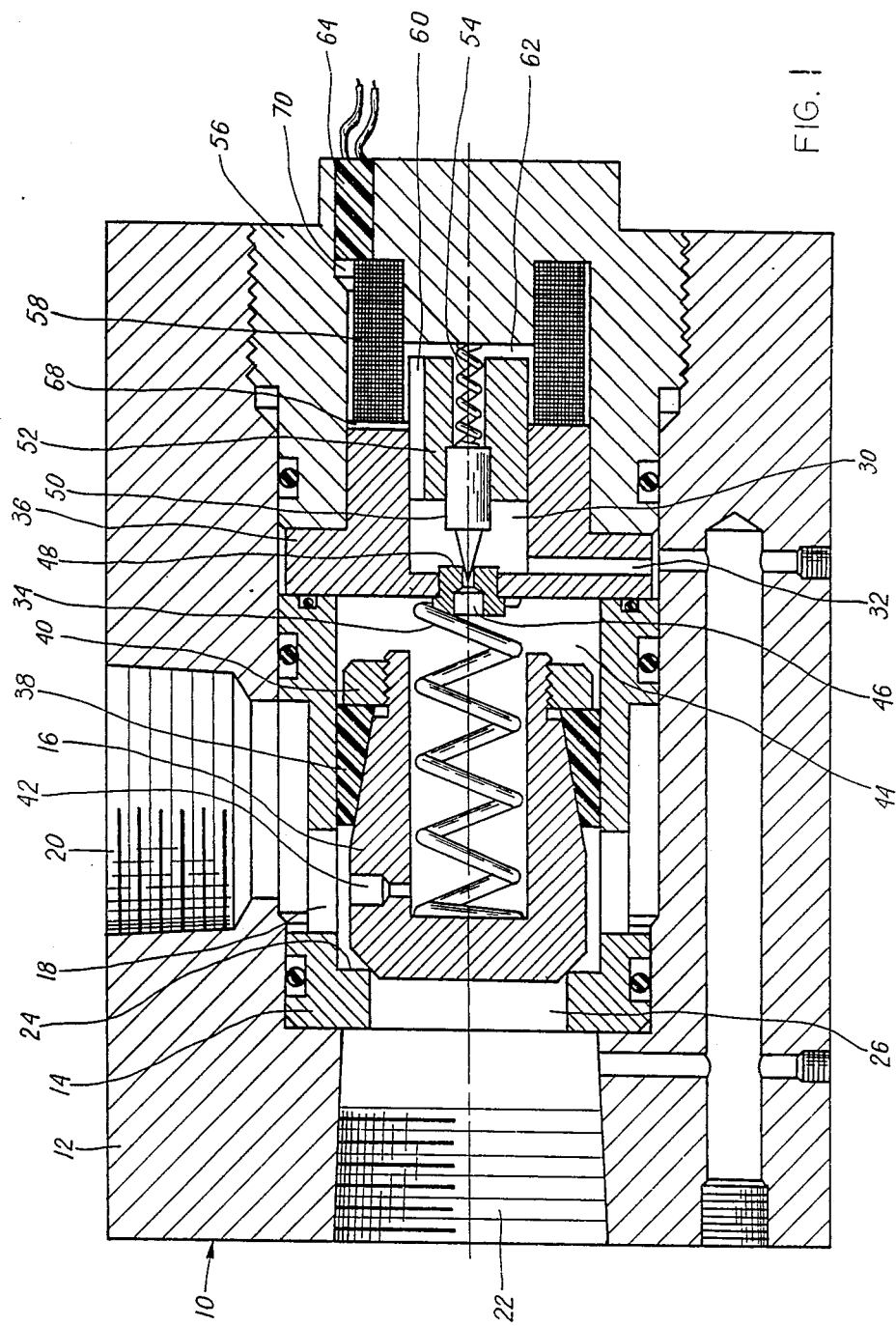
FIG. 1 is a cross-sectional view of the normally closed configuration of the solenoid controlled hydraulic valve with integrated solenoid of the present invention.

Referring now to the drawings in detail, where like numerals represent like elements, there is shown in FIG. 1 a hydraulic valve structure generally designated 10 comprising a valve body 12 having a longitudinally positioned valve sleeve 14 within which annulus the main valve member 16 reciprocates. The valve sleeve 14 has a number of circumferentially located apertures 18 for connecting with the main valve inlet connection 20 and the main valve outlet connection 22. The sleeve 14 also serves as the main valve seat 24 through which there is a central bore, the main valve passage 26. The main valve body 12 also includes a pilot flow passage 28 connecting the outlet connection 22 with the pilot valve chamber 30 through a pilot flow connecting passage 32.

Positioned concentrically along the longitudinal axis within a bore into the main valve member 16 is a biasing spring 34 which urges the main valve member 16 toward the main valve seat 24. The spring 34 abuts against a disk 36 situated in juxtaposition against the sleeve 14.

The main valve member 16 is substantially cylindrical in structure and toward the distal end, through which the spring 34 enters, tapers inward. Annularly disposed about this outer surface taper of the main valve member 16 is an adjustable seal 38 held in place by a nut 40 which circumferentially surrounds the distal end of the main valve member 16 and the spring 34 and applies pressure against the seal 38 as the nut 40 is tightened. Under tightening pressure from the nut 40, which is threadedly connected about the distal end of the main valve member 16, the seal 38 is pushed further upward along the taper formed on the exterior surface of the main valve member 16 expanding and forming a seal with and a bearing against the sleeve 14, simultaneously. This adjustment of the seal 38 reduces any leakage around the main valve member 16 to substantially zero. The adjustable seal 38 can be made of any deformable thermoplastic material, for example PTFE.

A metering orifice 42 is drilled into the main valve member 16 to connect the chamber 44 with the inlet connection 20 through the valve sleeve apertures 18. The chamber 44 includes an axially aligned central bore in the main valve member 16 in which the biasing spring 34 is partially housed. The metering orifice 42 provides for a fluid pressure connection through the main valve member 16 to the pilot orifice 46.

The main section of the valve is separated from the pilot valve section by the disk 36. A pilot orifice sleeve 48 is permanently attached within a central bore in disk 36. A tapered or stepped central bore in pilot sleeve 48 forms the pilot orifice 46. A pilot valve member 50 contacts and forms a closure with the pilot section side of the pilot orifice 46 to be described more fully hereinafter.

The disk 36 has an extended cylindrical section which extends away from the main valve section and serves to form the pilot valve chamber 30. Within the hollowed out cylindrical portion of the extended part of disk 36, i.e. the pilot valve chamber 30, an armature 52 is slidably disposed. Fixedly mounted to one end of the armature 52 is the pilot valve member 50. At the opposite end of the armature 52 and into a central bore of the armature is located a pilot section biasing spring 54 which urges the armature 52 toward the pilot orifice 46. The biasing spring 54 abuts or rests against the internal surface of the solenoid housing 56 which surrounds the cylindrical extension portion of the disk 36 and forms the rear wall of the pilot chamber 30. The armature 52 with its attached pilot valve member 50 can be pulled away from the pilot orifice 46 by the magnetic attraction of a solenoid coil 58. In order that the armature 52 depend solely for its motion on the biasing spring 54 and the magnetic attraction of the solenoid coil 58, a small longitudinal passage 60 extends from one end of the armature 52 to the other to connect the pilot valve chamber 30 with the pilot valve extension chamber 62. In this manner the armature 52 is pressure balanced so as to be unaffected in its movement by changes in fluid pressures within the valve.

The integrated solenoid of the present invention comprises the solenoid coil 58, the solenoid housing 56, the extended cylindrical portion of disk 36, and the armature 52. The integrated solenoid is constructed in such a manner that the slidable armature 52 is guided by the annulus of the extended cylindrical portion of the disk 36 which prevents the armature 52 from coming into proximate contact with the solenoid coil 58. In this manner the solenoid coil 58 is protected from wear or other damage which might result from direct contact between the solenoid coil 58 and the moving metallic body of the slidable armature 52. The solenoid coil 58 is fitted between the end of the extended cylindrical portion of disk 36 and the solenoid housing 56. The individual windings of the solenoid coil 58 are electrically insulated from the fluid within the valve, however, the solenoid coil 58, as a whole, is exposed to the fluid. The solenoid coil 58 receives its electrical energy from an external source by means of electrical conducting wires sealed within the conduit 64.

The solenoid coil 58 is pressure balanced in similar fashion to the armature 52. A connecting channel 68 provides for a fluid pressure connection between the pilot chamber 30 and a solenoid pressure balance chamber 70. With fluid of equal pressure surrounding the solenoid coil 58, there is no chance of deformation, distortion, or collapse of the coil causing a failure of the pilot section of the valve 10.

The magnetic relationship, within the pilot section among the extended cylindrical portion of disk 36, the solenoid coil 58, and the solenoid housing 56, creates a magnetic pole in the solenoid housing 56 aligned with the point at which the biasing spring 54 abuts the solenoid housing. This magnetic relationship causes the armature 52 to be attracted to or repelled from the solenoid housing 56. Each of these elements is made from metallic substance which conducts magnetic flux.

When the solenoid coil 58 is de-energized, the pilot section biasing spring 54 urges the armature 52 and its attached pilot valve member 50 in the direction of the pilot orifice 46. The pilot valve member 50 closes the pilot orifice 46 interrupting the pilot flow. When the pilot flow is interrupted, the pressures outside the main valve member 16 and inside the chamber 44 become equal. Thus, since the pressure force within the chamber 44 (having an area defined by the exposed surface of the disk 36 facing into the chamber 44) is greater than the pressure force outside the main valve member 16 (having an area defined by the surface between the main valve passage 26 and the annulus of the sleeve 14) the main valve member 16 responds to the urging of the biasing spring 34 and contacts the valve seat 24 blocking the main valve passage 26.

When the solenoid coil 58 is energized, the armature 52 with its attached pilot valve member 50 is electromagnetically attracted toward the solenoid housing 56. As the armature 52 is drawn the by magnetic force of the solenoid coil 58 toward the pole in the solenoid housing 56, the pilot valve member 50 is drawn out of the pilot orifice 46 opening the orifice and allowing the pilot flow to begin. The pilot flow begins at the inlet connection 20 flowing through the metering orifice 42, the chamber 44, the pilot orifice 46, the connecting passage 32, the pilot flow passage 28 and, finally, to the outlet connection 22. The flow of fluid through the metering orifice 42 creates a pressure loss in the chamber 44 so that the pressure therein becomes substantially lower than the pressure external to the main valve member 16. This differential in pressure causes the fluid pressure forces outside the main valve member 16 to overcome the force in the biasing spring 34 and push the main valve member 16 away from the valve seat 24 opening the main valve passage 42 between the inlet connection 20 and the outlet connection 22. For as long a period as the solenoid coil 58 is energized, the main valve passage 26 will remain open.

Figure 2:
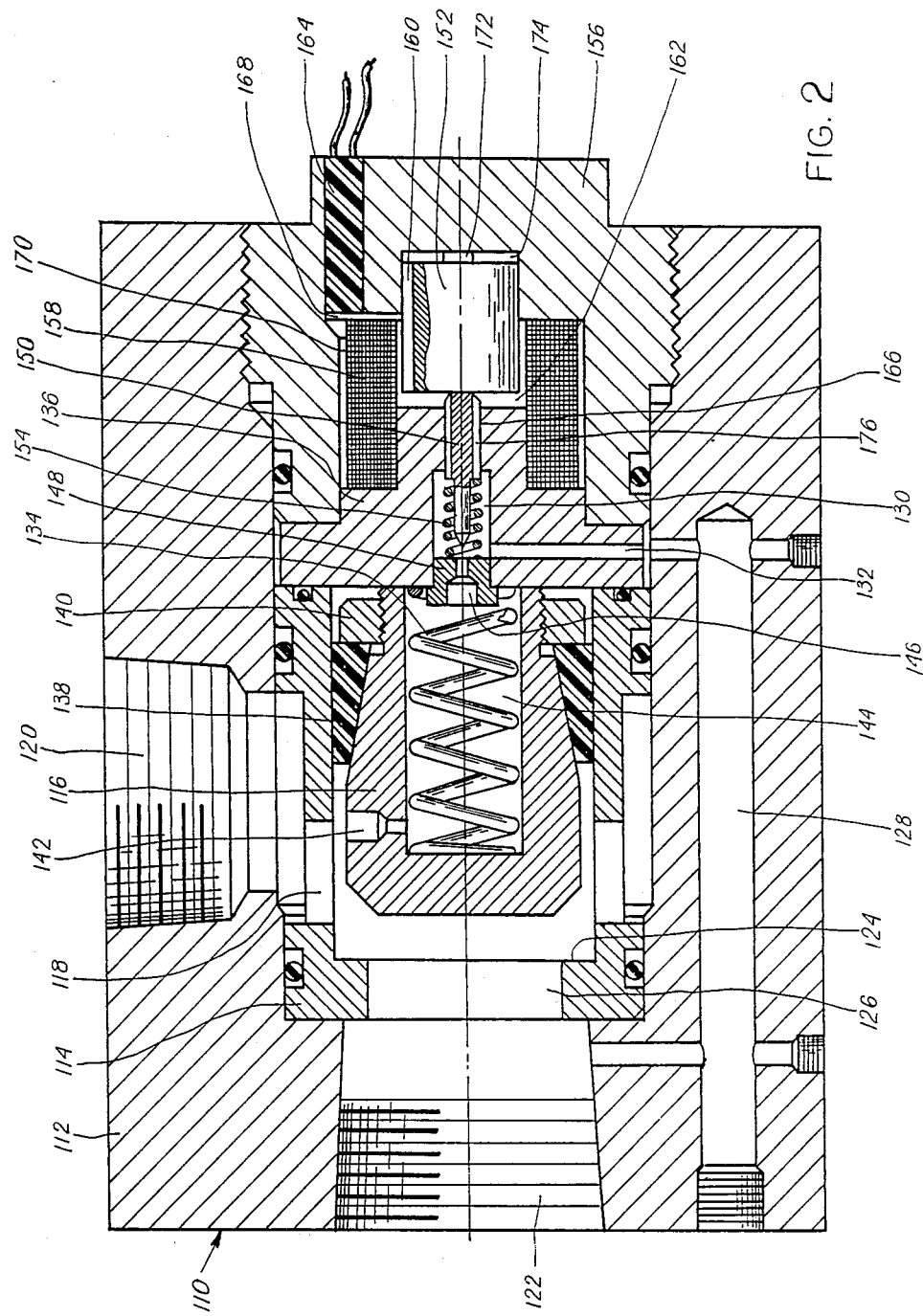
FIG. 2 is a cross-sectional view of the normally-open configuration of the solenoid controlled hydraulic valve with an integrated solenoid of the present invention.

Referring to the second embodiment of the present invention as shown in FIG. 2, the normally-open configuration of a hydraulic valve, generally designated 110, includes many structural and operating elements substantially identical to those of the normally-closed hydraulic valve 10 shown in FIG. 1. The normally-open hydraulic valve 110 comprises a valve body 112 having a longitudinally positioned valve sleeve 114 within which annulus the main valve member 116 reciprocates. The valve sleeve 114 has a number of circumferentially located apertures 118 for connection with the main valve inlet connection 120 and the main valve outlet connection 122. The sleeve 114 serves at the main valve seat 124 through which there is a central bore, the main valve passage 126. The main valve body 112 also includes a pilot flow passage 128 connecting the outlet port 122 with the pilot valve chamber 130 through a pilot flow connecting passage 132.

The normally-open hydraulic valve 110 also has positioned concentrically along the longitudinal axis within a bore into the main valve member 116 a biasing spring 134 which urges the main valve member 116 toward the main valve seat 124. The spring 134 abuts against a disk 136 situated in juxtaposition against the sleeve 114.

The main valve member 116 is substantially cylindrical in structure and toward the distal end, through which the spring 134 enters, tapers inward. Annularly disposed about this outer surface taper of the main valve member 116 is an adjustable seal 138 held in place by a nut 140 which circumferentially surrounds the distal end of the main valve member 116 and the spring 134 and applies pressure against the seal 138 as the nut 140 is tightened. Under tightening pressure from the nut 140, which is threadedly connected about the distal end of the main valve member 116, the seal 138 is pushed further upward along the taper formed on the exterior surface of the main valve member 116 expanding and forming a seal with and a bearing against the sleeve 114, simultaneously. This adjustment of the seal 138 reduces any leakage around the main valve member 116 to substantially zero. The adjustable seal 138 can be made of any deformable thermoplastic material, for example, PTFE.

As in the first embodiment of the present invention, a metering orifice 142 is drilled into the main valve member 116 to connect the chamber 144 with the inlet port 120 through the valve chamber sleeve apertures 118. The chamber 144 includes an axially aligned central bore in the main valve member 116 in which the biasing spring 134 is housed. The metering orifice 142 provides for a fluid pressure connection through the main valve member 116 to the pilot orifice 146.

The main section of the valve is separated from the pilot section by the disk 136. A pilot orifice sleeve 148 forms the pilot orifice 146. A pilot valve member 150 contacts and forms a closure with the pilot section side of the pilot orifice 146 to be described more fully hereinafter.

The disk 136 has an extended cylindrical section which extends away from the main section and serves to form a first pilot section chamber 130. At the distal end of the extended cylindrical portion of the disk 136 there is an axially aligned bore 166 through which the pilot valve member 150 reciprocates. The machining and tolerances of the bore 166 are such that the shaft of the pilot valve member 150 closely fits therewithin. The bore 166 acts as a guide means so that the pilot valve member 150 remains in axial alignment with the pilot orifice 146.

Within a second pilot section chamber 162, located immediately adjacent and outside the distal end of the extended cylindrical portion of the disk 136, surrounded by the solenoid coil 158 and fitting within a bore in the solenoid housing 156, is a magnetically controlled reciprocating armature 152. The armature 152 is able to freely slide in a reciprocating manner within the second pilot section chamber 162. At the furthest extent of its travel away from the pilot orifice 146, the armature 152 contacts a stop means 172 which restrains the armature 152 from coming into contact with the solenoid housing 156.

The pilot valve member 150 is kept in proximate contact with the proximal end of the armature 152 by the pilot chamber biasing spring 154. The proximal end of the biasing spring 154 abuts against the pilot sleeve 148 at a location surrounding the pilot orifice 146 and, at its distal end, contacts an enlarged shaft section of the pilot valve member 150. The biasing spring 154 urges the pilot valve member 150 against the proximal surface of the armature 152 (located in the second pilot section chamber 162) which, in turn, urges the armature 152 against the armature stop 172 preventing further travel by the armature 152 and the pilot valve member 150, although the biasing spring 154 will not be in full extension.

The armature 152, along with the pilot valve member 150, can be pushed toward the pilot orifice 146 by the magnetic forces occurring when the solenoid coil 158 is energized. In order that the armature 152 depends solely for its motion upon the biasing spring 154 and the magnetic forces of the solenoid coil 158, a small longitudinal passage 160 extends from one end of the armature 152 to the other to connect, and to permit fluid to flow between, the second pilot section chamber 162 and the pilot section extension chamber 174. In this manner the armature 152 is pressure balanced so as to be unaffected in its movement by changes in fluid pressures within the valve.

The integrated solenoid of the present invention comprises the solenoid coil 158, the solenoid housing 156, the extended cylindrical portion of disk 136, and the armature 152. The integrated solenoid is constructed in such a manner that the slidable armature 152 is guided by the annulus of a cylindrical bore in the solenoid housing 156 which prevents the armature 152 from coming into proximate contact with the solenoid coil 158. In this manner the solenoid coil 158 is protected from wear or other damage which might result from direct contact between the solenoid coil 158 and the moving metallic body of the slidable armature 152. The solenoid coil 158 is fitted between the extended cylindrical portion of disk 136 and the solenoid housing 156. The individual windings of the solenoid coil 158 are electrically insulated from the fluid within the valve, however, the solenoid coil 158, as a whole, is exposed to the fluid. The solenoid coil 158 receives its electrical energy from an external source by means of electrical conducting wires sealed within the electrical conduit 164.

The solenoid coil 158 is pressure balanced in similar fashion to the armature 152. The connecting channel 168 provides for a fluid pressure connection between the second pilot section chamber 162 and a solenoid pressure balance chamber 170. With fluid of equal pressure surrounding the solenoid coil 158, there is no chance of deformation, distortion, or collapse of the coil causing a failure of the pilot section of the valve 110.

The magnetic relationship within the pilot valve section of the normally-open hydraulic valve 110 among the extended cylindrical portion of the disk 136, the solenoid coil 158, and the solenoid housing 156, creates a magnetic pole in the extended cylindrical portion of disk 136 aligned with the point at which the shaft of the pilot valve member passes through the extended cylindrical portion of disk 136. This magnetic relationship causes the armature 152 to be attracted to or repelled from the extended cylindrical portion of disk 136. Each of these elements is made from a metallic substance which conducts magnetic flux.

Returning for the moment to the pilot valve member 150 and its extension shaft, the unit reciprocates through the bore 166 of the extended cylindrical portion of disk 136 to make proximate contact with the armature 152. The passage through which the pilot valve member passes, the bore 166, is a smooth, circular hole in the extended cylindrical portion of disk 136. The extension shaft of the pilot valve member 150 has at least one longitudinal slot which serves as a fluid pressure connecting means or passage 176 between the first pilot section chamber 130 and the second pilot section chamber 162 in which the armature 152 is housed. In order that the pilot valve member 150 remain in its axially aligned position, it is preferred, although not absolutely necessary if close machining tolerances are obtainable, that two slots be cut into the extension shaft of the pilot valve member 150. These slots should be 180° apart such that the pilot valve member 150 be slidable in reciprocating fashion through the bore 166 and remain properly aligned with the pilot orifice 146.

When a solenoid coil 158 is de-energized, the pilot section biasing spring 154 urges the armature 152 and the pilot valve member 150 in the direction of the solenoid housing 156. As the armature 152 is urged toward the solenoid housing 156, the pilot valve member 150 is drawn out of the pilot orifice 146 opening the orifice and allowing the pilot flow to begin. The pilot flow begins at the inlet connection 120 flowing through the metering orifice 142, the chamber 144, the pilot orifice 146, the connecting passage 132, the pilot flow passage 128 and, finally, to the outlet connection 122. The flow of fluid through the metering orifice 142 creates a pressure loss in the chamber 144 so that the pressure therein becomes substantially lower than the pressure external to the main valve member 116. This differential in pressure causes the fluid pressure force outside the main valve member 116 to overcome the force in the biasing spring 134 and push the main valve member 116 away from the valve seat 124 opening the main valve passage 142 between the inlet connection 120 and the outlet connection 122. For as long a period as a solenoid coil 158 remains de-energized, the main valve passage 126 will remain open.

When the solenoid coil 158 is energized, the armature 152 is magnetically attracted toward the extended cylindrical portion of disk 136. The armature 152 is pushing the pilot valve member 150 against the urging of the biasing spring 154 and will cause the pilot valve member 150 to close the pilot orifice 146 interrupting the pilot flow. When the pilot flow is interrupted, the pressure outside the main valve member 116 and inside the chamber 144 become equal. Thus, since the pressure force within the chamber 144 (having an area defined by the exposed surface of the disk 136 facing into the chamber 144) is greater than the pressure force outside the main valve member 116 (having an area defined by the surface between the main valve passage 126 and the annulus of the sleeve 114) the main valve member 116 responds to the urging of the biasing spring 134 and contacts the valve seat 124 blocking the main valve passage 126.

From the description of the two foregoing preferred embodiments of the present invention, it is apparent that a poppet valve can be constructed with its solenoid pilot control mechanism located within the main valve housing. This structure is achieved without the limitation of prior valves of this type restricting the fluid pressure without incurring substantially increased costs in constructing and operating such valves. Further, the novel configuration of the solenoid controlled pilot section of the valves of the present invention permit controlling flows of fluids having substantially increased pressures in solenoid controlled poppet-type valves. Also, the novel structure of a deformable plastic seal-bearing mounted over a distally located tapered portion of main valve member, creating not only a seal between the main valve member and the valve sleeve but also a bearing upon which the main valve member moves, eliminates leakage along the bearing surface between the sleeve and the main valve member resulting in a simpler structural relationship. Hence, poppet valves of larger dimensions for controlling flows having substantially higher fluid pressures is made possible.

The structural interrelationship of both the bearing and seal in the main valve chamber and of the pressure balanced armature and solenoid coil provide a greater efficiency in handling more accurately flows of fluid having increased pressures without the need to resort to external pilot valves of greatly increased size to handle the higher pressure fluids. Further, because the solenoid coil is integrated within the valve housing, a coil of relatively smaller size can be utilized because the magnetic flow path is not disrupted by detrimental gaps. The smaller size of the coil, or compactness, allows the coil to be placed within the valve housing and reduces the amount of conductor needed to achieve the magnetic force required to control the valve. There is, overall, a significant cost savings in placing the solenoid coil within the housing.

In regard to the second embodiment of the invention, the normally-open valve, the reversal of the structural arrangement of the elements in the pilot section of the valve significantly reduced the area available to apply the magnetic attraction to the armature. The magnetic pole, in this instance, resides in the disk on the proximal side of the armature, in distinction from the normally-closed valve where the pole resides on the distal side of the armature in the solenoid housing. In order to optimize the surface area of the pole to achieve the maximum attractive forces, it was necessary to create the two chambers. At the same time the alignment of the pilot valve member remains critical. A trade-off was necessitated between maximizing the surface area of the disk facing the armature and the size of the bore through which the pilot valve member reciprocates to open and close the pilot orifice. It was determined that in order to obtain maximum control over the pilot section that the pilot valve member would be demounted from the armature, as in prior valve of this type, but remain governed by the motion of the armature as assured by the biasing spring. In this manner, the maximizing of the surface area of the pole was accomplished in order to meet and overcome the requirements of the hydraulic control over the fluid flows governed by the valve.

The present invention may be embodied in other specific forms without departing from the spirit or essential attributes thereof, and, accordingly, reference should be made to the appended claims, rather than to the foregoing specification, as indicating the scope of the invention.

I claim:

1. A solenoid controlled hydraulic valve of normally-closed configuration including in combination:
   a valve housing, main and pilot sections, inlet and outlet connections, and pilot flow passages;
   said main section including a sleeve, a main valve member, an adjustable seal-bearing means, and a main valve chamber formed within said sleeve in which said main valve member reciprocates;
   said sleeve, interposed between said inlet and outlet connections, forms the main passage therebetween and provides a seat closure for the main valve member;
   said adjustable seal-bearing means surrounds a distally disposed inwardly tapering portion of said main valve member and simultaneously engages the exterior surface of the main valve member and the interior surface of the sleeve creating a leak resistant separation between the main flow passage and the main valve chamber;
   a metering orifice providing a connection between the main flow passage and the main valve chamber through the sidewall of the main valve member to provide a flow path permitting differential pressures to be created between the main flow passage and the main valve chamber to operate the main valve member when a pilot flow is applied;
   a disk member disposed between said pilot section and said main section;
   a first spring means disposed within an annulus in the main valve member and opposed against said disk member for assisting in the operation of the main valve member;
   said pilot section including a solenoid coil and housing, an armature responsive to magnetic forces, a pilot valve member, and a pilot valve chamber formed within a cylindrical extension of the disk member and extending within the solenoid coil in which said pilot valve member and said armature reciprocate;
   said disk member having an aperture therethrough to provide a pilot flow orifice which may be opened and closed by said pilot valve member in accordance with the energizing and de-energizing of the solenoid coil;
   a second spring means disposed within an annulus in said armature and opposed against said solenoid housing for urging said armature and pilot valve member to attain a position closing the pilot flow orifice;
   said solenoid coil being disposed within the solenoid housing, which is integrated within the valve housing, having its curvilinear external surfaces simultaneously exposed to equal fluid pressure of the pilot flow; wherein, upon energizing the solenoid coil, the armature and pilot valve member are pulled toward a magnetic pole in the solenoid housing, opening the pilot flow orifice, causing a pilot flow to begin which causes a decrease in pressure in the main valve chamber and, in turn, the unseating of the main valve member in response to the decrease in pressure in the main valve chamber; and upon de-energizing the solenoid coil, the armature and pilot valve member are again urged by said second spring means toward the pilot flow orifice, closing the pilot flow orifice, causing the pilot flow to cease which causes an increase in pressure in the main valve chamber and, in turn, the seating of the main valve member in response to the increase of pressure in the main valve chamber.

2. A solenoid controlled hydraulic valve of normally-open configuration including in combination:
   a valve housing, main and pilot sections, inlet and outlet connections, and pilot flow passages;
   said main section including a sleeve, a main valve member, an adjustable seal-bearing means, and a main valve chamber formed within said sleeve in which said main valve member reciprocates;
   said sleeve, interposed between said inlet and outlet connections, forms the main passage therebetween and provides a seat closure for the main valve member;
   said adjustable seal-bearing means surrounds a distally disposed inwardly tapering portion of said main valve member and simultaneously engages the exterior surface of the main valve member and the interior surface of the sleeve creating a leak resistant separation between the main flow passage and the main valve chamber;
   a metering orifice providing a connection between the main flow passage and the main valve chamber through the sidewall of the main valve member to provide a flow path permitting differential pressures to be created between the main flow passage and the main valve chamber to operate the main valve member when a pilot flow is applied;
   a disk member disposed between said pilot section and said main section;

a first spring means disposed within an annulus in the main valve member and opposed against said disk member for assisting in the operation of the main valve member;

said pilot section including a solenoid coil and housing, an armature responsive to magnetic forces, a pilot valve member, a first pilot valve chamber formed within a cylindrical extension of the disk member in which said pilot valve member reciprocates, and a second pilot valve chamber formed within the solenoid housing and extending within the solenoid coil in which said armature reciprocates;

said disk member having an aperture therethrough to provide a pilot flow orifice which may be opened and closed by said pilot valve member in accordance with the energizing and de-energizing of the solenoid coil;

a second spring means disposed about said pilot valve member and opposed against said disk member for urging said pilot valve member and said armature to attain a position opening the pilot flow orifice;

said solenoid coil being disposed within the solenoid housing, which is integrated within the valve housing, having its curvilinear external surfaces simultaneously exposed to equal fluid pressure of the pilot flow;

wherein, upon energizing the solenoid coil, the armature and pilot valve member are pulled toward a magnetic pole in the cylindrical extension of the disk member, closing the pilot flow orifice, causing a pilot flow to cease which causes an increase in pressure in the main valve chamber and, in turn, the seating of the main valve member in response to the increase of pressure in the main valve chamber;

and upon de-energizing the solenoid coil, the armature and pilot valve member are again urged by said second spring means away from the pilot flow orifice, opening the pilot flow orifice, causing the pilot flow to begin which causes a decrease in pressure in the main valve chamber and, in turn, the unseating of the main valve member in response to the decrease in pressure in the main valve chamber.

* * * * *